March 21, 1950  F. A. DOWLER  2,501,163
ROTATING CUTTING REEL LAWN MOWER
Filed June 9, 1947  3 Sheets-Sheet 3

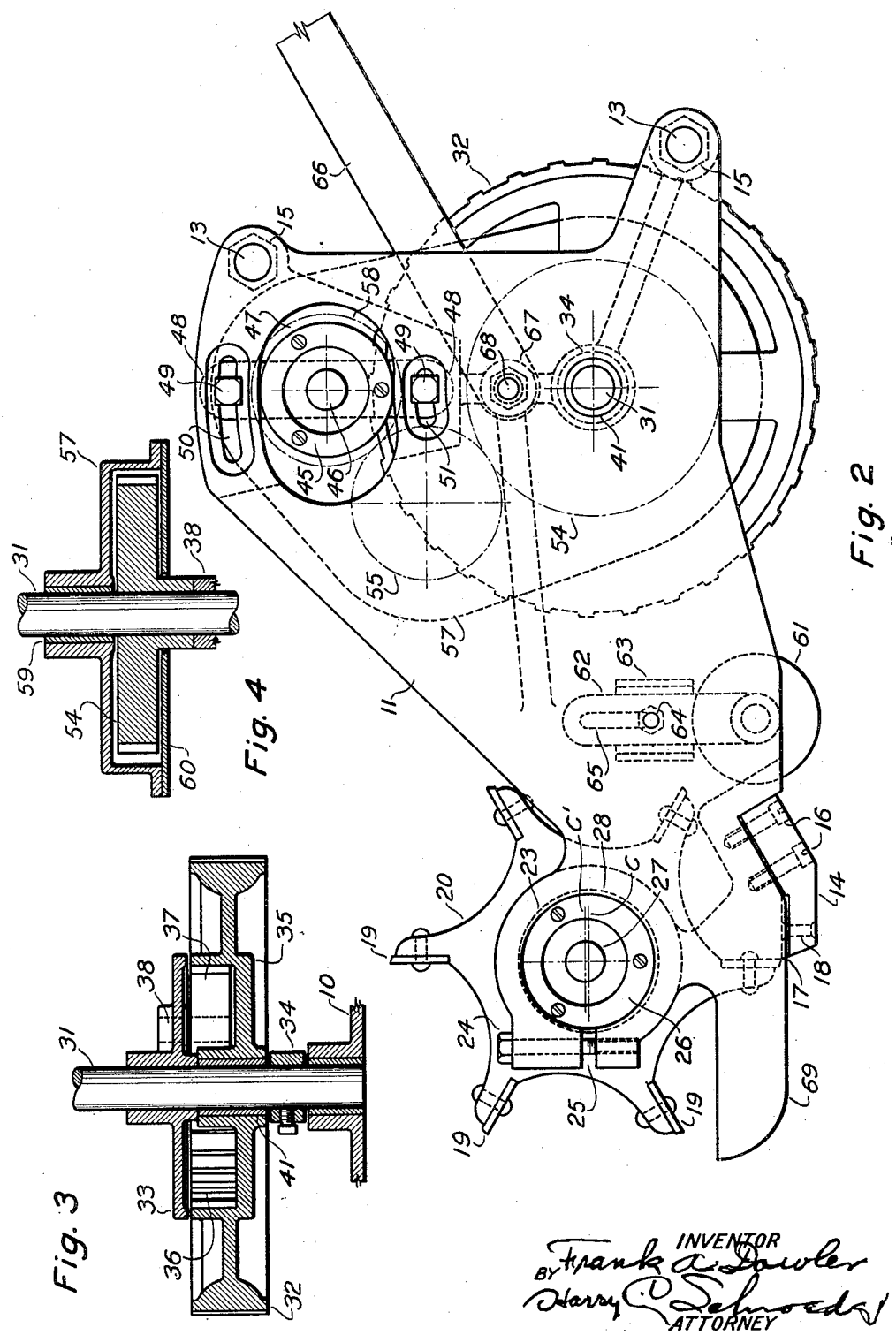

INVENTOR.
Frank A. Dowler
BY
Harry Schroeder
ATTORNEY

UNITED STATES PATENT OFFICE 2,501,163

ROTATING CUTTING REEL LAWN MOWER

Frank A. Dowler, Alameda, Calif.

Application June 9, 1947, Serial No. 753,433

4 Claims. (Cl. 56—249)

This invention relates to lawn mowers and has for its principal object the provision of a power mower especially adapted to operate to the extreme edge of the lawn, regardless of the presence of a fence, coping or other structure which ordinarily would interfere with such operation.

A further object of the invention is the provision of a lawn mower having a rotor mounted on individually adjustable bearings, whereby close cooperation between the fixed and moving blades can be maintained.

A still further object of the invention is the provision of a lawn mower having a belt driven rotor, and means adapted to maintain the belt in the desired state of tension.

These and other objects of the invention will become apparent during the course of the following description, taken in connection with the accompanying drawings forming a part hereof, and in which:

Figure 2 is a side elevation of the mower with the belt and pulleys removed.

Figure 3 is a section through one of the traction wheels taken on line 3—3 of Figure 5.

Figure 4 is a section through the gear box taken on the line 4—4 of Figure 6.

Figure 1:
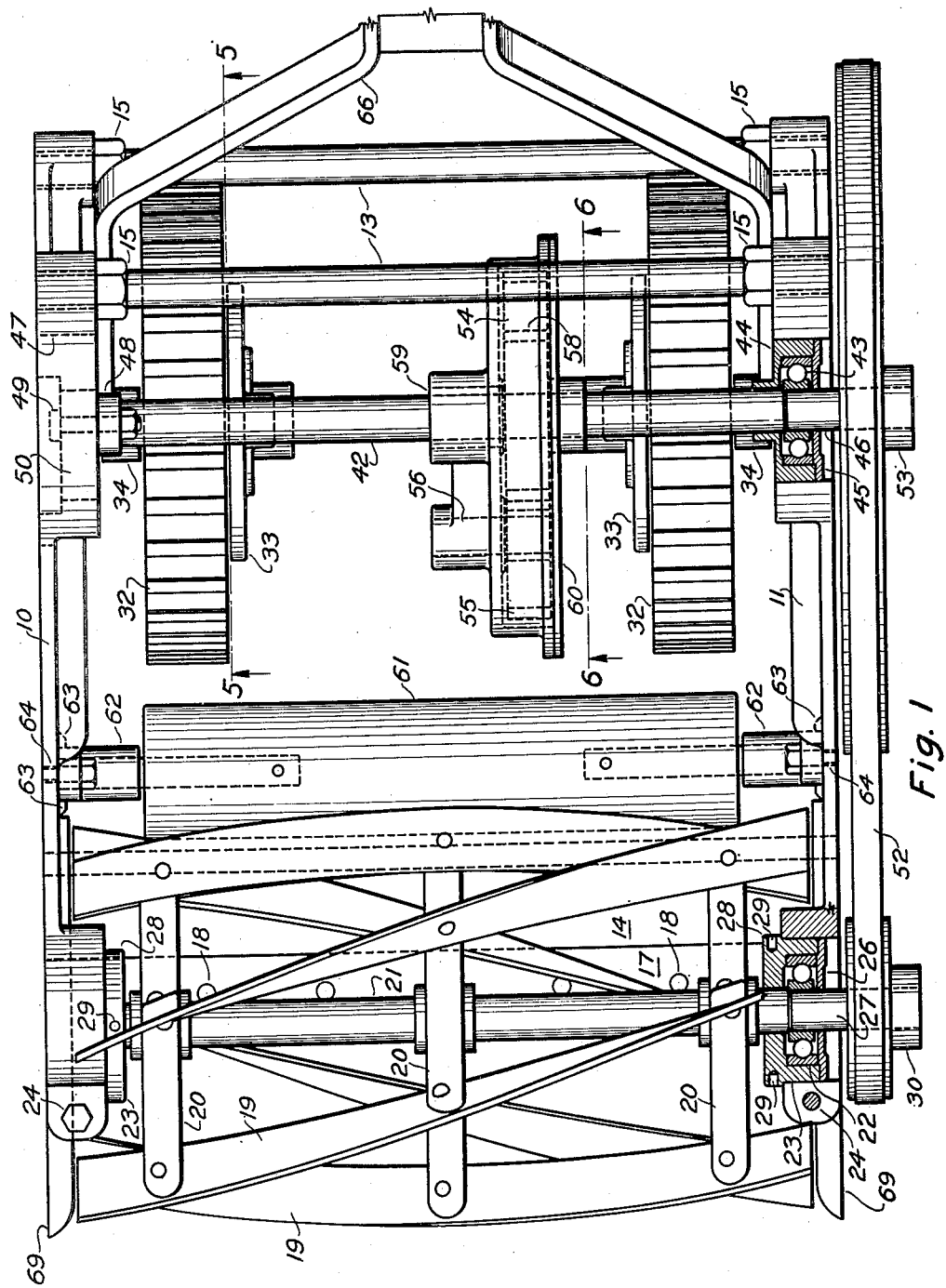
Figure 1 is a plan view of my improved mower, parts being shown in section.
Figure 5:
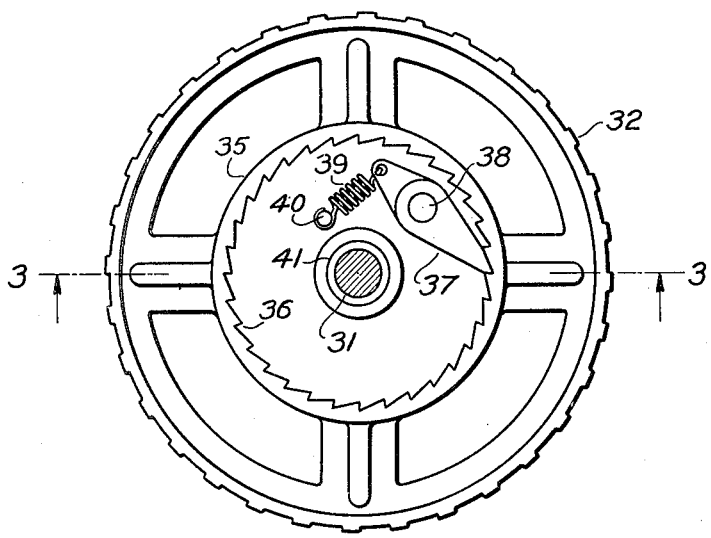
Figure 5 is a section taken on line 5—5 of Figure 1.
Figure 6:
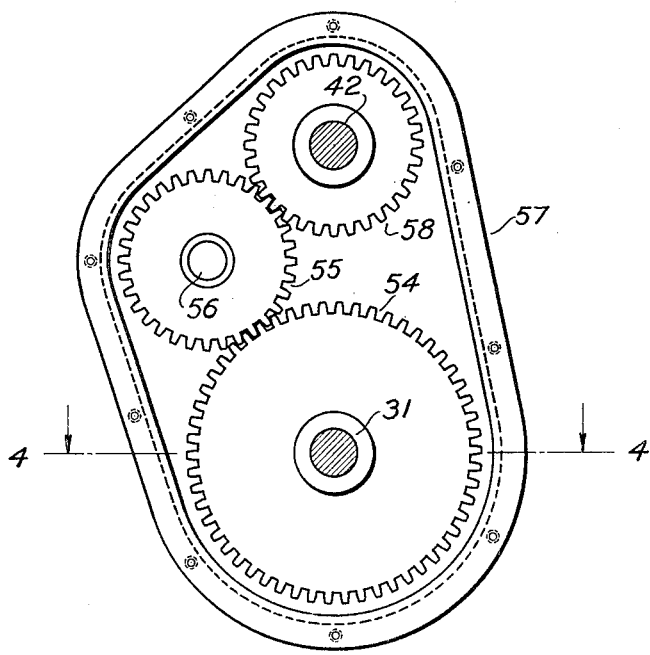
Figure 6 is a section taken on line 6—6 of Figure 1, the gear case cover being removed.

Referring to the drawings in detail, my improved lawn mower comprises matching right and left side frames 10 and 11 respectively, held together in spaced relation by a pair of tie rods 13 and the fixed blades supporting bar 14. The tie rods 13 are provided with threaded ends, one end being threaded right hand and the other end having a left hand thread. The rod engaging holes in the frames 10 and 11 are tapped accordingly, accurate adjustment between the side frames is therefore possible. After adjustment, the tie rods 13 are locked against further rotation by means of nuts 15.

The fixed blade supporting bar 14 is drilled and counterbored, adjacent each end, to receive screws 16, by means of which it is firmly secured in machined recesses formed in the lower edges of the side frames 10 and 11. A fixed blade 17 is attached to the bar 14 by means of countersunk rivets 18.

A plurality of helical, rotary blades 19 are riveted to spaced spiders 20 fixedly mounted in spaced and aligned relation upon a shaft 21. The shaft 21 is mounted in ball bearings 22 housed in bearing housings 23, which are locked in place in aligned bored holes provided for their reception in the side frames 10 and 11. Locking screws 24 are provided, and coact with slots 25 to secure housings 23 fixedly in place.

The housings 23 are fitted with covers 26, the one in frame 10 being blank, while the one in frame 11 is bored to receive the extension 27 of the shaft 21. The housings 23 are also provided with flanges 28 adapted to form shoulders which engage the inner sides of the frames 10 and 11 and maintain the housings 23 in correct spaced relationship. The edges of the flanges 28 are drilled to provide adjusting holes 29.

Referring to Figure 2, it will be noted that the exterior of the bearing housing 23 is machined concentric with center line C, while the bore is eccentric thereto, but is coaxial with the intersection of the vertical center line and line C'. By this arrangement, adjustment of the blades 19 relative to the blade 17 can be effected by loosening screws 24 and rotating the housings 23, by means of the adjusting holes 29, the desired amount in the proper direction.

A driven pulley 30, fixedly mounted on the extension 27 of the shaft 21, completes the rotor assembly.

Rotatably mounted, upon a shaft 31, between the frames 10 and 11, is a pair of traction wheels 32 maintained in spaced relationship by drive plates 33 and set screw collars 34, as can be seen on Figure 3. The wheels 32, which have the conventional tread, are constructed with a concentric hollow drum 35 having an internal ratchet 36, the teeth of which are adapted to engage a pawl 37 pivotally mounted upon a pin 38 carried by and fixedly attached to the drive plate 33. A tension spring 39, anchored by a pin 40 mounted on the drive plate 33, urges the pawl 37 into engagement with the ratchet 36. The drive plates 33 are fixedly mounted upon the shaft 31; therefore, with the parts assembled as indicated on Figure 3, it will be apparent that rotation of the wheels 32, in a forward direction, will cause the plates 33 and consequently the shaft 31 to rotate with them. Rotation of the wheels 32 in the reverse direction is accomplished without any transmission of motion other than the riding of the pawl 37 over the teeth of the ratchet 36, and in this direction the wheels 32 rotate upon the shaft 31, bushings 41 being provided to minimize the friction.

Mounted above shaft 31, and parallel thereto, is a shaft 42 rotatably supported in ball bearings 43 contained within bearing housings 44. Housings 44 are fitted with covers 45, the one in frame 10 being blank, while the one in frame 11 is bored to receive the extension 46 of the shaft 42. The housings 44 are mounted upon the frames 10 and 11, their body portions being contained within elongated arcuate openings 47, and their mounting lugs 48 being clamped by means of bolts 49 passing through slots 50 and 51. The openings 47 and the slots 50 and 51 are all of arcuate shape having their center lines parallel and concentric with the axis of shaft 31; it will be apparent therefore that the housings 44 may be aligned and locked in any position within the openings 47 and the center distance between shafts 31 and 42 will remain constant. It will further be apparent that this feature of the mounting of shaft 42 will enable adjustment to increase or decrease the center distance between it and the rotor shaft 21. By this means it is possible to adjust the tension of the belt 52 carried by the driven pulley 30 and a driving pulley 53 which is fixedly mounted upon the extension 46 of the shaft 42.

Rotary motion is transmitted from shaft 31 to shaft 42 by means of a gear 54, fixedly mounted on shaft 31, an idler pinion 55 rotatably mounted on a pin 56 secured within a gear case 57, and a driven pinion 58 fixedly mounted on the shaft 42. The gear case 57 which, in effect, floats upon the rotatable shafts 31 and 42, is equipped with bushings 59 adapted to minimize the friction of the rotating shafts. Idler pinion 55 is also bushed for free rotation upon pin 56.

Gear 54 and pinion 58 carry bosses which extend through clearance holes in the gear case cover 60.

Referring to Figure 2, whereon the pitch circles of the gears have been indicated, and in consideration of the ratchet and pawl mechanism heretofore described, it will be obvious that forward motion of the machine will cause rotation of the shaft 31 in a counterclockwise direction. Motion being transmitted through the idler pinion 55 to the driven pinion 58, shaft 42 will also revolve in a counterclockwise direction. Counterclockwise rotary motion is further transmitted to the rotor shaft 21 by means of the driving pulley 53, the belt 52 and the driven pulley 30. The gears and pulleys forming the power transmitting means are designed to ensure correct speed ratio between the traction wheels 32 and the rotor shaft 21.

The bar 14 is maintained clear of the ground by the conventional roller 61 rotatably mounted in vertically adjustable brackets 62. The brackets are secured to the inner sides of the frames 10 and 11 within channels formed by projecting parallel ribs 63, by bolts 64 passing through slots 65, in the brackets 62, and engaging tapped holes in the side frames 10 and 11.

The conventional bifurcated handle is fragmentarily indicated by the numeral 66, and is pivotally mounted on bosses 67, on the side frames, and secured thereto by bolts 68 screwed into tapped holes in said bosses.

As previously stated, the main object of the invention is the provision of a mower adapted to operate to the extreme edge of the lawn, and with this in view, the blades 19 have been extended laterally as far as possible to still maintain clearance between the ends of the blades and the side frames. Recesses have also been provided for the heads of the bolts 49, in the slots 50 and 51, and as can be seen on Figure 1, there are no projecting elements on the outer side of frame 10. An additional factor contributing to the efficiency of the machine, with especial reference to its novel feature, is the provision of grass deflecting horns 69, projecting from the extreme forward lower portion of the frames 10 and 11, and being adapted to guide the blades of grass into the path of the rotating cutters.

From the foregoing, it will be apparent that I have devised a machine that will accomplish the afore stated objects, and while I have disclosed my invention in a preferred embodiment, it should be understood that modifications may be made within the spirit and scope of the appended claims.

I claim:

1. A lawn mower comprising a pair of opposed side frames, a drive shaft mounted between said frames adapted for rotation by traction means, a jack shaft also mounted between said frames and operably connected to said drive shaft, a power transmission case mounted for pivotal movement about said drive shaft and supported thereby, a rotatable cutter mounted between said frames, power transmitting means connected between said jack shaft and said rotatable cutter, bearing supports at the ends of said jack shaft, and means carried by said frames for securing said bearing supports in different concentric positions about said drive shaft.

2. A lawn mower comprising a pair of opposed side frames, a drive shaft mounted between said frames, a traction wheel mounted on said drive shaft having a one way driving connection therewith, a jack shaft extending between said frames parallel with said drive shaft and being operably connected to said drive shaft, a rotatable cutter mounted at the forward end of said frames and extending laterally beyond the outer limits of said traction wheel, a power transmitting means connecting said jack shaft and said rotatable cutter, a supporting bearing at each end of said jack shaft, and means for securing said supporting bearings upon said frames in adjustable relation to said rotatable cutter without affecting the driving connection between said jack shaft and said drive shaft.

3. In a lawn mower of the character described the combination of, a pair of side forming frames secured together in spaced relation, a driving shaft extending between and journaled at its ends upon said frames, ground engaging traction means having a one way driving connection with said drive shaft and disposed between the outer limits of said frames, a jack shaft extending between said frames above and parallel with said drive shaft, a gear train having an enclosing housing journaled upon said drive shaft and forming a spacing connection between said drive shaft and said jack shaft, a rotatable cutter journaled between said frames forward of said jack shaft and having blades extending beyond the limits of the ground engaging traction means upon said drive shaft, a pulley and belt connection between said jack shaft and said rotatable cutter, a floating bearing at each end of said jack shaft adapted for arcuate movement about said drive shaft as defined by said gear train housing, and means for securing said floating bearings upon said frames in various positions relative to said rotatable cutter, whereby the belt and pulley driving connection between said rotatable cutter and said jack shaft may be adjusted for proper operation without affecting the gear train connection between the jack shaft and said drive shaft.

4. In a lawn mower of the character described the combination of, a pair of side forming frames secured together in spaced relation, a driving shaft extending between and journaled at its ends upon said side forming frames, traction means having a one way driving connection with said drive shaft and disposed between the outer limits of said frames, a jack shaft extending between said frames above and parallel with said drive shaft, a gear train having an enclosing housing journaled upon said drive shaft and forming a spacing connection between said drive shaft and said jack shaft, a rotatable cutter journaled between said frames forward of said jack shaft and having blades extending beyond the limits of the ground engaging traction means upon said drive shaft, a pulley and belt driving connection between said jack shaft and said rotatable cutter, a floating bearing at each end of said jack shaft adapted for arcuate movement about said drive shaft as defined by said gear train housing, and means extending through concentric arcuate slots in said side forming frames for securing said floating bearings in various positions relative to said rotatable cutter.

FRANK A. DOWLER.

REFERENCES CITED

The following references are of record in the file of this patent:

UNITED STATES PATENTS

| Number | Name | Date |
|---|---|---|
| 1,144,720 | Bahnson | Jan. 9, 1923 |

FOREIGN PATENTS

| Number | Country | Date |
|---|---|---|
| 29,843 | Great Britain | Dec. 21, 1909 |
| 195,432 | Great Britain | Apr. 3, 1923 |
| 371,684 | Great Britain | of 1932 |